United States Patent [19]

Lamy et al.

[11] Patent Number: 5,437,172
[45] Date of Patent: Aug. 1, 1995

[54] ANTI-THEFT DEVICE FOR EYEGLASSES

[75] Inventors: Patrick Lamy, Saillenard, France; Arnaldo Mazzucchelli, Grumello Del Monte, Italy

[73] Assignee: Plasti-Max SpA, Grumello Del Monte, Italy

[21] Appl. No.: 209,477

[22] Filed: Mar. 14, 1994

[30] Foreign Application Priority Data

Mar. 12, 1993 [FR] France .............. 93 02859

[51] Int. Cl.⁶ .............. A41D 27/22; E05B 69/00
[52] U.S. Cl. .............. 70/57.1; 24/459; 24/484; 24/704.1; 206/807; 211/4; 211/113; 351/158
[58] Field of Search .............. 70/57.1, 58, 59, 62; 211/4, 13, 113; 248/902; 24/3 C, 704.1, 484, 459; 206/807, 5 R; 351/133, 158; 223/85, 87

[56] References Cited

U.S. PATENT DOCUMENTS

| | | | |
|---|---|---|---|
| 3,116,829 | 1/1964 | Pacelli | 206/5 |
| 3,422,570 | 1/1969 | Vorst et al. | 24/484 X |
| 4,695,026 | 9/1987 | Medley, Jr. | 248/902 X |
| 4,878,641 | 11/1989 | Vogt | 248/902 X |
| 4,976,532 | 12/1990 | Nyman | 351/158 |
| 4,987,754 | 1/1991 | Minasy et al. | 70/57.1 |
| 5,018,253 | 5/1991 | Oppenheimer | 206/5 X |
| 5,119,652 | 6/1992 | Costa | 70/57.1 |
| 5,129,617 | 7/1992 | MacWilliamson | 206/5 X |
| 5,139,324 | 8/1992 | West | 351/158 |
| 5,141,104 | 8/1992 | Morrow et al. | 351/158 X |
| 5,144,345 | 9/1992 | Nyman | 248/902 X |
| 5,144,820 | 9/1992 | Holmgren | 70/57.1 |
| 5,178,283 | 1/1993 | Ennis | 211/4 |

FOREIGN PATENT DOCUMENTS

| | | |
|---|---|---|
| 2631801 | 12/1989 | France . |
| 928546 | 6/1963 | United Kingdom ............ 206/5 R |
| 2268397 | 1/1994 | United Kingdom ............ 223/85 |
| WO89/06820 | 7/1989 | WIPO . |

Primary Examiner—Lloyd A. Gall
Attorney, Agent, or Firm—Larson and Taylor

[57] ABSTRACT

An anti-theft device has a plate for hanging it and a link. The link is arranged to form a closed loop over a bridge of a pair of eyeglasses. A fastener belonging to the plate receives a free end of the link. It is only releasable with a special tool. The link consists of an element of flexible plastic material and of a reinforcement.

8 Claims, 2 Drawing Sheets

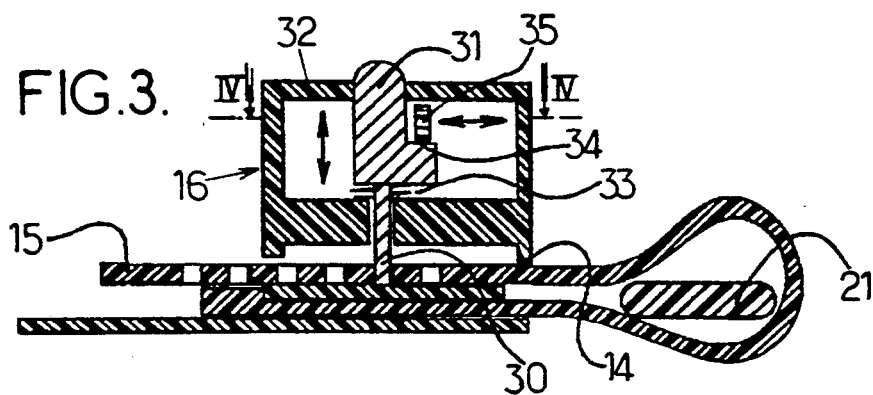
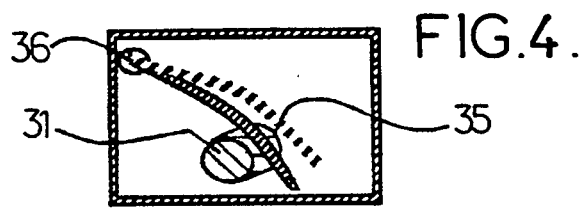
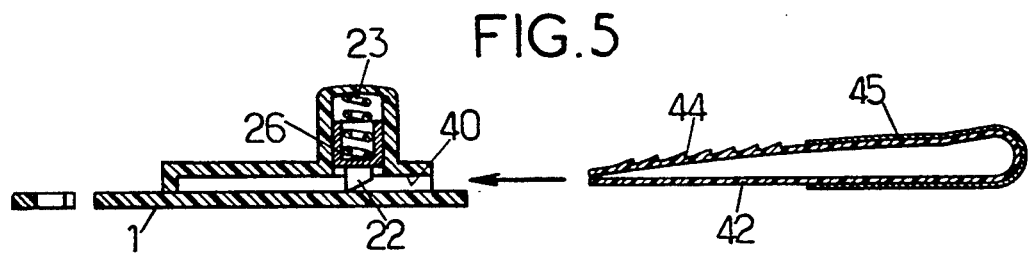
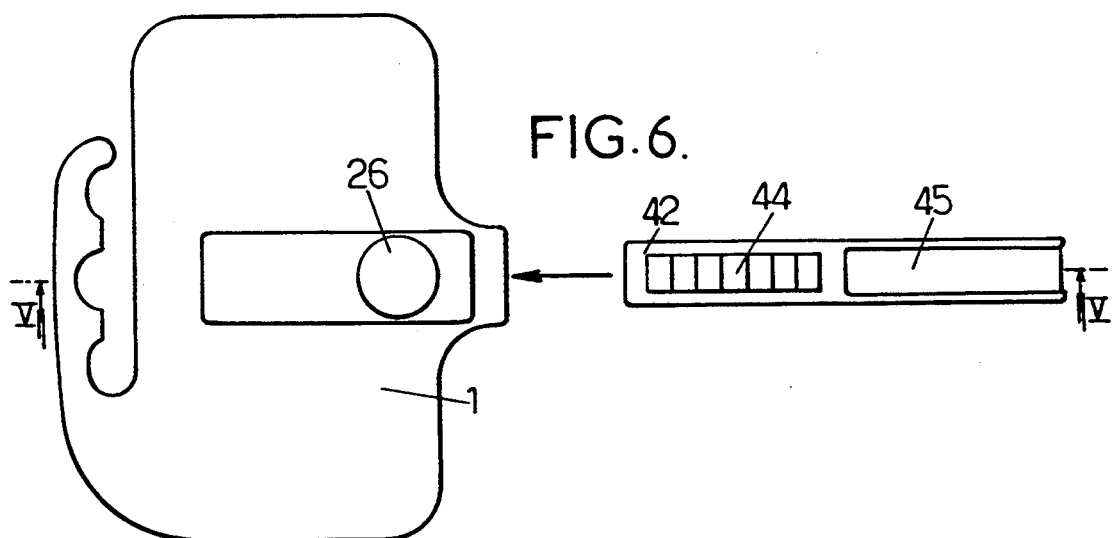
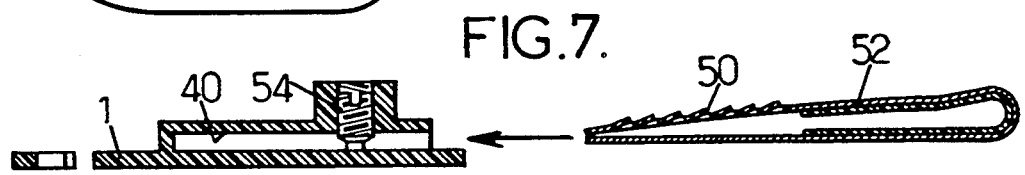

ANTI-THEFT DEVICE FOR EYEGLASSES

BACKGROUND OF THE INVENTION

The present invention relates to anti-theft devices for eyeglasses, consisting of a hanger for locating one of several pairs of eyeglasses on a display, enabling a customer to try on a number of eyeglasses without any need for removing the hanger.

A prior art anti-theft device, disclosed in document FR-A-2 631 801, comprises a ring which may be locked on one branch of a pair of eyeglasses and prevents a customer from folding the branches and leaving the store with the eyeglasses in his pocket. That device requires a display on which the eyeglasses are stored flat.

Another anti-theft device, disclosed in WO-A-89/06 820, consists of an element formed with means for hanging it to a cantilever rod and having a relatively narrow extension which, in use, passes over the bridge of the eyeglasses, forms a loop and is closed by a rivet or a snap-type device. The extension may be severed relatively easily with a cutter. The device is for a single use and must be discarded after it has been removed from a pair of eyeglasses sold to a customer.

U.S. Pat. No. 4,987,754 (Minasy et al) shows a magnetically releasable target lock for use in holding a target wafer to an article of merchandise of quite specific construction, unsuitable for use in a display hanger for eyeglasses.

SUMMARY OF THE INVENTION

It is an object of the invention to provide an anti-theft device for eyeglasses which may be reused and effectively counters pilferage.

For that purpose, there is provided an anti-theft device comprising: a plate formed with apertured means adapted to receive a support, link means arranged to form a closed loop over a bridge of a pair of eyeglasses, and fastening means on said plate, said fastening means being manually engageable for locking said link means on said plate and preventing separation of said pair of eyeglasses from said device and only releasable with a special tool, said link means comprising an element of relatively weak flexible material and reinforcement means for rendering cutting of said link means difficult.

The fastening means may be magnetically releasable and such a construction will typically be used when it is important that removal of the device by a shop attendant be fast and/or it is preferred to use the standard releasing tool which is available to the attendants for other types of anti-theft devices, secured to garments for instance. If, on the other hand, cost reduction is a primary concern, then fastening means releasable with a special tool, typically a screw driver with an unusual blade end shape, may be preferred.

Frequently the element made of plastic material will be separate from the plate and made of a material which is more flexible, for instance polyamide or polyurethane rather than polyethylene such as that known under the brand name ABS.

The reinforcement means may comprise a metal wire or cable embedded in the element of plastic material. However, it may also consist of a U-shaped outer metal element. In a particular embodiment, which may be preferable when unauthorized removal by cutting the loop should be strongly deterred, there is provided a device comprising: a plate of relatively stiff plastic material formed with apertured means adapted to receive a support rod, a U-shaped link comprising an outer metal element of such strength as not to be opened easily and an inner element of plastic material for contact with a bridge of a frame of a pair of eyeglasses, and fastening means carried by said plate, having slot means for receiving both end portions of said link and locking means constructed to engage into cooperating means of said link upon manual insertion of said end portions into said slot means and to be releasable only with a special tool.

The above features and others, suitable for use with the preceding ones but possibly used separately, will more clearly appear from a reading of the following description of preferred embodiments.

BRIEF DESCRIPTION OF THE DRAWINGS

FIG. 3 is a cross-sectional view of another embodiment;

FIG. 4 is a cross-section along line IV—IV of FIG. 3;

FIG. 5, similar to FIG. 2, illustrates another embodiment of the invention, in cross-section along line V—V of FIG. 6; and FIG. 6, similar to FIG. 5, illustrates still another embodiment.

FIG. 7 is a cross-sectional view of another embodiment.

DETAILED DESCRIPTION

Figure 1:
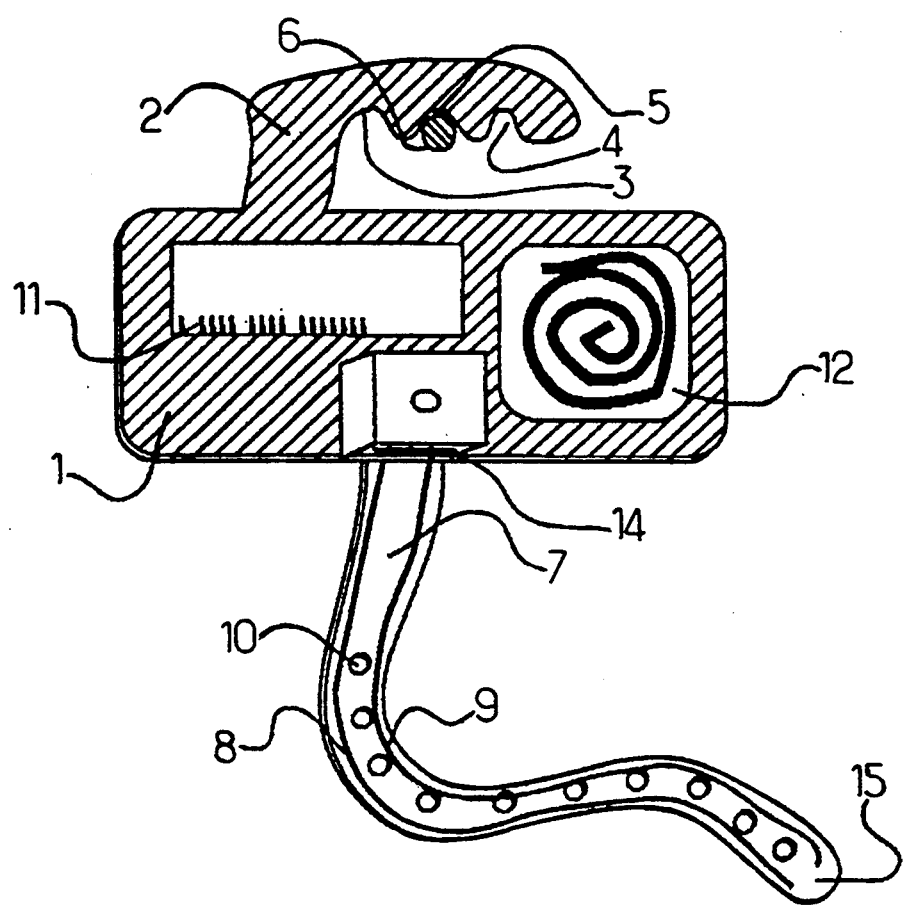
FIG. 1 is a front view of a device according to a particular embodiment of the invention.
Figure 2:
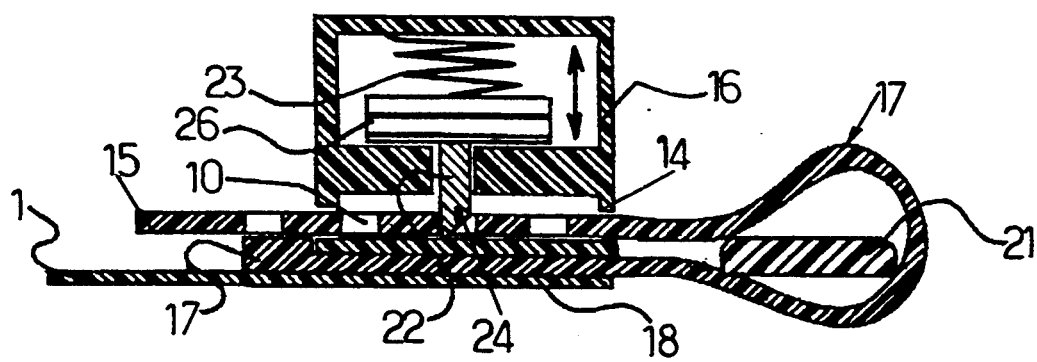
FIG. 2 is a cross-sectional view of a device according to a first embodiment.

Referring to FIGS. 1 and 2, a device comprises a plate 1, typically of plastic material (but which may be of metal, except where magnetic actuation is required) having a hook shaped portion 2, with slots 3, 4 and 5.

The hook-shaped portion makes it possible to hang the device onto a display rod 6. The plate 1 may carry a label 11 indicating the price, references and bar code identification of the article. It may further carry or contain a flat coil 12 which constitutes a tuned antenna which interacts with a warning system detecting the article if carried past a protected path. The label may be bonded to or integral with the plate.

Opposite to the hook shaped portion, the plate is extended by a link 7. The link is of flexible plastic material and reinforced. As shown in FIG. 1, the link is reinforced by two steel wires or cables 8,9 preventing cutting, embedded in the plastic material. Several holes 10 are formed in and distributed along the link.

The link 7 may be integral with and molded with the plate. Then the plate and link should be of a same material. It is consequently of advantage to make the plate and link separately and to constitute the link of more flexible material. Then the end portion of the link which should be fixed to the plate may have an end bulge 17 arranged to abut the housing and to prevent withdrawal of the link through a slot 18 traversed by the end portion.

In both cases the plate has a slot 14 for inserting the free end portion 15 of link 7 and has fastening means for retaining that end portion. The fastening means constitute a block 16 having a housing which may be partially molded with the remainder of the plate if the plate is of plastic material. As illustrated in FIGS. 1 and 2, the link is connected to the plate 1 by inserting it into a slot 18 until the bulged portion 17 is in abutment. The cross section of slot 18 is sufficient for the link to slide therein. After the link 7 has been looped around the bridge 21 of the frame of the eyeglasses, it is inserted into the slot 14 to be locked therein.

As illustrated in FIG. 2, the fastening means comprise a pin 22 which is movable perpendicularly to the link and is apt to project into one of holes 10 under the action of a spring 23. The pin may be given a square cross section, for preventing rotation thereof, or it may be cylindrical. The end of the pin has a slanted surface 24 for easier insertion of the link while preventing unauthorized removal.

The fastening means shown in FIG. 2 are magnetically releasable. The pin is fast with a plate 26 of magnetic or ferromagnetic material. A special unlocking tool, available for instance at the counter of the shop, comprises a cavity sized to receive the housing of block 16 and having a bottom wall containing a magnet for drawing the plate 26, withdrawing the pin and enabling removal of the free end portion of the link.

It will be appreciated that such an anti-theft device can be re-used without difficulty.

In the modified embodiment shown in FIGS. 3 and 4, the pin 30 is fast with a button 31 which terminates substantially flush with the surface 32 of the molded housing of block 16. A spring 33 located in the housing exerts a force on the button which biases the pin 30 out of a hole 10 in the link 7. The button 31 has a flat shoulder 34 which cooperates with a locking blade 35 movable in the housing in a plane perpendicular to the axis of pin 30. The movable blade 35 is made of magnetizable resilient material, for instance of steel. One of its ends is secured to a support 36 fast with the molded housing of block 16. At rest, the blade 35 contacts button 31. After the latter has been pushed down manually, the blade moves into the gap between the flat shoulder 34 and an inner surface of the molded housing 16, as shown in full lines in FIG. 4.

If then the housing is located against a releasing tool generating a magnetic field, the movable blade 35 is drawn in a direction away from the button 31, as seen in broken lines in FIG. 4. Since the flat shoulder is not retained any longer, the unit consisting of pin 30 and button 31 is moved back by spring 33 to a position where it releases the link 7.

In the modified embodiment illustrated in FIGS. 5 and 6, where the elements corresponding to those already described are designated by the same reference numerals, the plate 1 and the housing of the fastening means define a single slot 40, for receiving both end portions of link 7. The pin 22 of the fastening means is again fast with a plate 26 of magnetizable material. A spring 23 biases the pin to a projecting position. The link is composite. It has a strap 42 of relatively flexible plastic material having molded teeth 44 for cooperation with pin 22. The link further comprises a reinforcement consisting of a U-shaped metal element 45 whose length is such that there is a small or no length of naked strap out of slot 40 when the anti-theft device is operative on eyeglasses, for rendering it impossible to cut the link where it is not reinforced or strengthened. The U-shaped element 45 may be bonded to the strap by molding the strap over the element.

When the link has been inserted, the stiffness of the U-shaped element prevents withdrawal of that end portion of the link which is only engaged into the slot 40 and which is not retained by pin 22.

The U-shaped metal element 45 cannot damage the bridge of the eyeglasses, since it is separated therefrom by the strap 42 of plastic material.

The same result may be attained by using, as illustrated in FIG. 7, a link consisting of a metal strip 50 which is U-shaped, which can be very thin, in which a rack is formed by stamping, and a liner 52 of plastic material located inside the loop.

The plate will typically by made of a relatively stiff plastic material, such as polyethylene, while the strap or liner will frequently be made of polypropylene or polyamide. The U-shaped element will typically be some tenths of a millimeter thick.

As shown in FIG. 7, the magnetically releasable fastening means may be replaced by other types, and for instance by a screw 54 located in an internally threaded passage of the housing of the block, having a head requiring a special tool for screwing and unscrewing.

Still other modifications are possible and in particular some arrangements of a described embodiment may be used in another embodiment.

We claim:

1. Anti-theft device for removably mounting a pair of eyeglasses on a display, comprising:
   a plate formed with aperture means adapted to receive a support;
   link means arranged to form a closed loop over a bridge of a pair of eyeglasses, and
   fastening means on said plate, said fastening means being engageable with said link means for locking said link means on said plate and preventing separation of said pair of eyeglasses from said device and only releasable from said link means with a special tool;
   said link means comprising an element of relatively weak flexible plastic material and reinforcement means for rendering cutting of said link means difficult.

2. Device according to claim 1, wherein said reinforcement means comprise at least a metal cable embedded in said element of plastic material.

3. Device according to claim 1, wherein said fastening means comprise: a pin movable between a forward position where it projects into a slot arranged to receive an end portion of said link means and a withdrawn position where it clears said slot; spring means for biasing said pin toward said forward position; and a magnetizable element fast with said pin, movable within a non-magnetic housing belonging to said plate and arranged to be acted upon against the biasing force of the spring means through the housing by magnet means belonging to said special tool.

4. Device according to claim 3, wherein said housing and plate constitute a one-part molding of polyethylene.

5. Anti-theft device for removably mounting a pair of eyeglasses on a display support, comprising:
   a plate of relatively stiff plastic material formed with aperture means adapted to receive a support rod;
   a U-shaped link comprising an outer metal element of such strength as not to be opened easily and an inner element of plastic material for contact with a bridge of a frame of a pair of eyeglasses; and
   fastening means carried by said plate, having slot means for receiving both end portions of said link and locking means constructed to engage into cooperating means of said link upon manual insertion of said end portions into said slot means and to be releasable only with a special tool.

6. Device according to claim 5, wherein said fastening means comprise a pin biased by a spring toward a position where it projects into said slot means and a magnetizable member fast with said pin and arranged to be acted upon by magnet means belonging to said special tool to move said pin and magnetizable member against the force of said spring.

7. A device according to claim 5, wherein said inner element is longer than said outer element and formed with means for engagement of said pin, said outer metal element being of sufficient length for being close to an entrance of said slot means when said link is locked to said fastening means.

8. A device according to claim 5, wherein said outer metal element is longer than said inner element and formed with means for engaging a pin.

* * * * *